United States Patent [19]
Herrick

[11] 3,774,848
[45] Nov. 27, 1973

[54] WATER DRIVEN VEHICLE
[76] Inventor: Richard Herrick, 19401 N.W. 8th Ave., North Miami, Fla. 33169
[22] Filed: July 24, 1972
[21] Appl. No.: 274,439

[52] U.S. Cl. .......................... 239/191, 46/41, 180/2, 180/7, 280/206, 239/289
[51] Int. Cl. .............................................. B05b 3/00
[58] Field of Search .................... 180/2, 7; 280/206; 46/41; 239/191, 192, 289

[56] References Cited
UNITED STATES PATENTS

| | | | |
|---|---|---|---|
| 485,532 | 11/1892 | Crepeau | 239/191 |
| 729,650 | 6/1903 | Olofsson | 239/191 |
| 836,875 | 11/1906 | Gilbert | 180/2 |
| 1,313,081 | 8/1919 | Finney | 280/216 |
| 1,503,360 | 7/1924 | Gardner | 239/191 X |
| 1,885,620 | 11/1932 | Moyer | 239/192 X |

Primary Examiner—Leo Friaglia
Attorney—John Cyril Malloy

[57] ABSTRACT

A water driven tricycle especially for use by children for play and serving a secondary purpose of watering a lawn. The water cycle includes a carriage and a paddle wheel with holding means on the cycle to hold the end of a garden hose and to direct a stream of water from the hose against the paddles to transmit power through a transmission means to the axle of the vehicle to cause it to move over the ground while the sprayed water is dispersed in a pattern over the lawn.

6 Claims, 2 Drawing Figures

PATENTED NOV 27 1973  3,774,848

WATER DRIVEN VEHICLE

FIELD OF THE INVENTION

This invention relates to a tricycle or other land vehicle which is driven by water from a garden hose impinging upon a paddle wheel to drive the vehicle.

BACKGROUND OF THE INVENTION

As is well known, children on hot days like to play with sprinklers, water hoses and the like in order to cool themselves. Often on such days, lawns also need watering. This invention has an object the provision of a land vehicle, such as a tricycle, which includes a paddle wheel in combination with a transmission means so that water directed toward the paddles in stream will cause the vehicle to travel over a lawn and which includes a holder means and collector and dispersal means so that the stream is directed towards the paddle and after energy is used to drive the vehicle, it will be dispersed in a pattern over the lawn as the vehicle travels watering it simultaneously with the child playing.

In accordance with these and other objects which will become apparent hereinafter, the instant invention will be described with reference to the accompanying drawings in which:

DETAILED DESCRIPTION OF THE DRAWINGS

Figure 1:
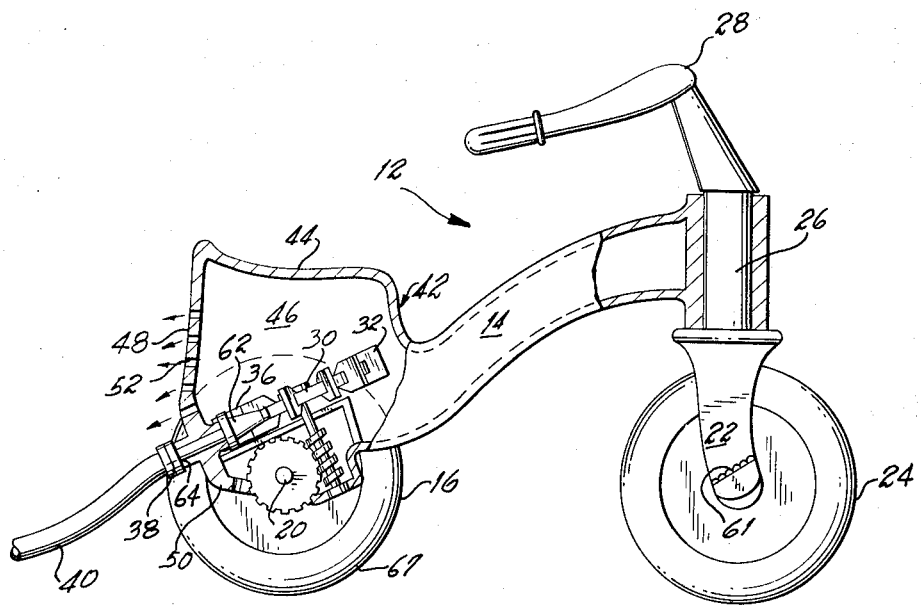
FIG. 1 is a side elevation view of the water cycle which has been partly broken away to illustrate the instant invention.
Figure 2:
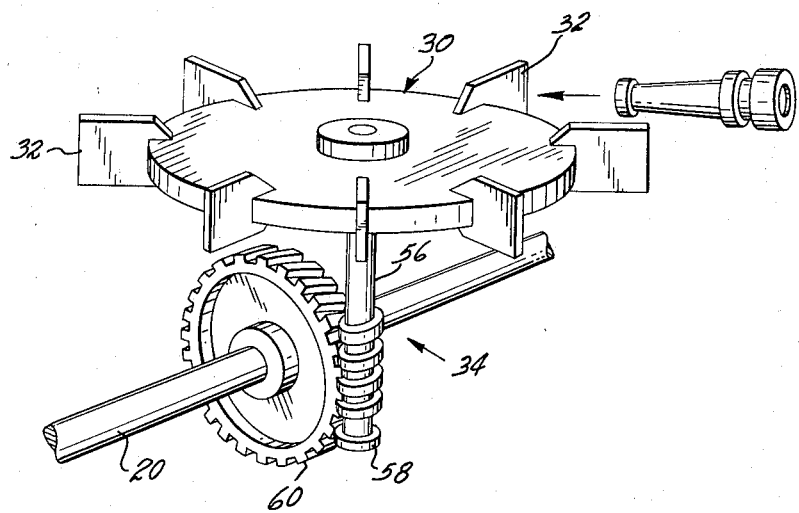
FIG. 2 is a perspective view illustrating the operation of the instant invention.

Referring to FIG. 1, wherein like reference characters designate like or corresponding parts throughout the several views, the numeral 12 generally designates the vehicle which may be a tricycle comprising a carriage including a frame 14 with wheels, such as 16, journaled thereto by means of an axle 20 suitably supported on the frame, and steering means, which in the case of a tricycle include a fork 22 and wheel 24 journaled in the bifurcation with a shaft 26 connecting the wheel 24 to the handle bars 28. The vehicle also includes drive means in the form of a turbine wheel 30 having paddles, such as 32, symmetrically arranged thereabout. A transmission means generally designated by the numeral 34 is provided connecting the drive means to the carriage wheels. Suitable holding means 36 are provided for the terminal end fitting 38 of a hose 40, the holding means being carried on the frame and arranged to direct a stream of water from the hose against the paddles in a tangentially directed path to drive the carriage. In the preferred embodiment the frame 14 includes a collector means in the form of an enclosed receptacle 42 the top surface of which provides the seat 44 for an operator and which defines a chamber 46 about the turbine wheel and includes in its wall 48 and floor 50 a plurality of openings, such as those designated by the numeral 52 from which water after impinging upon the paddles is adapted to be directed in a pattern generally over the path traversed by the vehicle. In the preferred embodiment the transmission includes a drive shaft 56 connected to the turbine wheel 30 and gear means interconnecting the axle 20 and the drive shaft, the gear means including a worm gear 58 meshing with a gear 60 keyed to the axle. The wall of the receptacle includes an opening 64 through which the hose is adapted to extend and preferably nozzle means 62 are provided to concentrate the stream of water against the paddle wheel. A single garden hose is adequate; however, additional garden hose may be desired. On the fork of the vehicle, foot rests 61 may be provided or, alternatively, conventional paddle wheels so that the vehicle can be used either with or without a garden hose.

Further in the preferred embodiment, the tread 67 of the tires is of the type for travel over a garden hose and is preferably enlarged to spread the load of the operator so as not to leave marks in a lawn. A control valve may be included in the nozzle means of the hose so that by turning the hose relative to its fitting, while the nozzle is held in a fixed position, the spray of water can be controlled which also serves to control the speed which a vehicle will travel. Additionally, a control lever may be provided to disengage the worm by movement of it axially. Further, differential means may be provided by arranging the transmission to drive one rear wheel only so that the other is free wheeling. The invention is not limited to a tricycle; the same being adapted for use on wagons or other similar type vehicle used by children.

What is claimed is:

1. A land vehicle comprising:
   a wheeled vehicle and vehicle operator steering means;
   drive means on the carriage including a turbine wheel having paddles symmetrically arranged therearound;
   transmission means connecting the drive means and the carriage wheels;
   holding means for the terminal end of a water hose orienting a garden hose to direct water from the hose against the paddle to drive the carriage; and
   collector means including a roof defining a seat for the operator, said collector means to collect and discharge the water in a pattern as the vehicle travels over a lawn.

2. The improvement as set forth in claim 1 wherein the collector means includes shield means to direct water spray away from an operator of the vehicle.

3. The improvement as set forth in claim 1 wherein the vehicle includes an axle and said transmission means includes a gear on said axle and a drive shaft connected to the turbine and a one-gear on said shaft meshing with said gear means.

4. A land vehicle as set forth in claim 1 wherein the collector means comprises a receptacle about the turbine wheel and ports arranged in a pattern in the receptacle.

5. The improvement as set forth in claim 1 wherein the drive shaft extends generally vertically from said turbine wheel and said gear on said axle is arranged tranversely of said axle.

6. The land vehicle as set forth in claim 1 wherein said carriage comprises a tricycle.

* * * * *